US008678242B2

(12) United States Patent
Lüchinger et al.

(10) Patent No.: US 8,678,242 B2
(45) Date of Patent: Mar. 25, 2014

(54) DOSAGE-DISPENSING DEVICE FOR FREE-FLOWING SUBSTANCES

(75) Inventors: Paul Lüchinger, Uster (CH); Sandra Ehrbar, Gutenswil (CH)

(73) Assignee: Mettler-Toledo AG, Greifensee (CH)

( * ) Notice: Subject to any disclaimer, the term of this patent is extended or adjusted under 35 U.S.C. 154(b) by 128 days.

(21) Appl. No.: 13/454,746

(22) Filed: Apr. 24, 2012

(65) Prior Publication Data

US 2012/0279608 A1 Nov. 8, 2012

(30) Foreign Application Priority Data

May 4, 2011 (EP) ...................................... 11164771

(51) Int. Cl.
*G01F 11/00* (2006.01)
(52) U.S. Cl.
USPC ........... 222/200; 222/196; 222/198; 222/161; 141/72; 141/268
(58) Field of Classification Search
USPC ......... 222/196, 198, 200, 161, 287, 333, 410; 221/200; 209/448, 197; 34/164; 141/72, 268
See application file for complete search history.

(56) References Cited

U.S. PATENT DOCUMENTS

| 1,029,243 | A | * | 6/1912 | Thompson | 222/594 |
|---|---|---|---|---|---|
| 3,186,602 | A | * | 6/1965 | Ricciardi | 222/161 |
| 4,172,535 | A | * | 10/1979 | Smith | 222/58 |
| 5,341,963 | A | * | 8/1994 | Mott et al. | 222/287 |
| 5,947,169 | A | * | 9/1999 | Wegman et al. | 141/71 |
| 6,987,228 | B1 | | 1/2006 | MacMichael et al. | |
| 7,284,574 | B2 | | 10/2007 | Fontaine et al. | |
| 2007/0145067 | A1 | * | 6/2007 | Headlee | 222/1 |
| 2008/0190513 | A1 | | 8/2008 | Luechinger et al. | |
| 2008/0302835 | A1 | * | 12/2008 | Luechinger et al. | 222/410 |
| 2009/0159153 | A1 | | 6/2009 | Luechinger | |

* cited by examiner

*Primary Examiner* — Paul R Durand
*Assistant Examiner* — Charles P Cheyney
(74) *Attorney, Agent, or Firm* — Standley Law Group LLP

(57) ABSTRACT

A device (110, 10) dispenses dosages of a free-flowing substance from a source unit (70) containing the substance. The device has a base unit (120, 20) and a receiving unit (130, 30), so that the source unit can be set into, and removed from, the receiving unit. An actuator (150, 50) generates repeated bidirectional pivoting movements of the receiving unit about the base unit. A connector unit (140, 40), arranged between the base unit and the receiving unit, pivotally supports the receiving unit, providing rotational mobility about a pivoting axis. The connector unit is slidably supported with translatory mobility relative to the base unit. The actuator generates repeated bidirectional translatory movements of the base unit. In this way, the receiving unit is subjected to repeated bidirectional pivoting movements and, superimposed on the latter, repeated bidirectional translatory movements.

20 Claims, 2 Drawing Sheets

DOSAGE-DISPENSING DEVICE FOR FREE-FLOWING SUBSTANCES

CROSS-REFERENCE TO RELATED APPLICATIONS

This application is entitled to benefit of a right of priority under 35 USC §119 from European patent application EP 11164771.5, which was filed on 4 May 2011, the content of which is incorporated by reference as if fully recited herein.

TECHNICAL FIELD

The disclosed embodiments relate to a dosage-dispensing device for dosage material in powder form, specifically a dosage-dispensing device that includes a holder device with the capability to loosen the dosage material which is contained in a dosage-dispensing unit.

BACKGROUND OF THE ART

Dosage-dispensing devices for material in powder form are used in particular to dispense small quantities of a substance into small target containers with a high degree of precision. In many cases, the target containers are placed on a balance in order to weigh the dosage material delivered by the dosage-dispensing device, so that it can subsequently be further processed according to a given purpose.

The dosage material to be dispensed is contained for example in a dosage-dispensing unit which includes a source container and a dispensing head. It is desirable to dispense the dosage material through a narrow discharge orifice of the dosage-dispensing unit, so that it can be filled in a targeted stream even into a container with a small opening diameter.

Ideally, dosage material in powder form flows, propelled by gravity, in a uniform stream out of a small discharge orifice, comparable to the sand flowing in an hourglass. In this ideal case, the flow of the dosage material could be controlled simply by varying the aperture cross-section of the discharge orifice with a suitable shutter device. Unfortunately, most of the materials used in practice don't behave according to the ideal case. Many of the particles that make up the dosage material are not conforming to an ideal flow behavior. It is often observed that particles clot together during the dispensing process, with the consequence that the dosage-dispensing unit becomes clogged up. Only by mechanical intervention can the clogging be removed, so that the dispensing process can be continued.

In addition, many powders are compressible, leading to the formation of clumps of compacted powder which can clog the discharge orifice partially or completely. A typical example is cornstarch, which exhibits a strong tendency of the powder particles to stick together. In addition, cornstarch is very compressible. In view of these properties, cornstarch is often used as a sample material to test the performance of dosage-dispensing devices. The problems which are caused by the sticking-together and the compressibility of a dosage material, also referred to as "stickiness" of a dosage material, have led to numerous proposals for a solution and for designs of dosage-dispensing devices, specifically their dispensing heads. There are dispensing heads, for example, which have conveyor screws designed to move the sticky dosage material from the source container to the discharge orifice of the dispensing head. The state of the art further includes stirring and scraping devices which scrape the dosage material from the interior walls of the source container and propel it towards the dispensing orifice. The stirring devices also have the purpose to prevent the formation of so-called bridges of the dosage material in the source container. Instead of, or in combination with, a stirring device, there are also tapping and vibrating devices among the known state-of-the-art solutions.

A possible way to solve the aforementioned problems is disclosed in US published application 2006/0011653 A1. A dosage-dispensing device designed to dispense dosage material in powder form in quantities from a few milligrams to a few grams with a weight tolerance of less than ±5% of the target weight includes a dosage-dispensing unit which is in essence composed of a source container and a dispensing head. From the part that connects to the source container, the inside wall of the dispensing head is conically tapered towards a discharge orifice. In the operating state, the discharge orifice is at the bottom of the dosage-dispensing unit and thus below the source container. Propelled by gravity, free-flowing dosage material inside the dosage-dispensing unit flows towards the discharge orifice. The latter is equipped with a shutter valve which serves to regulate the outflow of dosage material. The dosage-dispensing device includes means for vibrating and/or tapping the source container and can further include a stirrer device capable of rotary motion about, as well as linear motion along, its axis of rotation.

In tests with cornstarch, severe difficulties were encountered in the attempts to dispense the material out of differently designed dosage-dispensing units. The free-flow ability of this kind of dosage material depends directly on how loosely it is aggregated, i.e. by its bulk density. In some tests it was found that the dosage material was compacted, instead of loosened up, by the use of a stirrer device and/or a vibrating means. This had the result that, even with the discharge orifice fully opened, no dosage material could be moved out of the dosage-dispensing unit.

A solution for this problem is disclosed in EP 1959244 A1. The dosage-dispensing device disclosed there includes a holder device and at least one receiving device. The receiving device is designed so that at least one dosage-dispensing unit can be removably seated in it. The dosage-dispensing device further includes at least one actuator to agitate the receiving device. The receiving device is pivotally supported on the holder device, so that the actuator can impart oscillating swivel movements to the receiving device. The actuator performs this function by directing a short sequence of several tapping strikes at the receiving device, causing the latter to swing like a pendulum. The pendulum frequency of the receiving device is preferably out of step with the impact frequency of the actuator. This has the effect that the shock waves or mechanical pulses generated by the strikes are propagating in different directions. This counteracts the tendency of the dosage material to clump together. Nevertheless, there may still be some clumping of the dosage material in isolated instances. The known state of the art includes moving components, for example stirrers or scrapers, which are arranged in the dosage-dispensing unit and serve to counteract the clotting of the dosage material. These movable components require a complex mechanism and are prone to wear out. In addition, the additional movable parts can cause damage in particular to delicate dosage materials.

It is therefore an objective to provide a dosage-dispensing device which has the capability to condition the dosage material in the dosage-dispensing unit prior to the dispensing process and for the dispensing process, specifically to loosen up the dosage material and to thereby counteract the clogging of the dosage-dispensing unit, but wherein no movable parts are arranged in the interior of the dosage-dispensing unit.

SUMMARY

This task is solved with a dosage-dispensing device having the features set forth in the independent patent claim.

The dosage-dispensing device, which serves to dispense measured quantities of free-flowing substances, includes a base unit, at least one receiving unit and at least one actuator. The receiving unit is designed so that at least one dosage-dispensing unit can be set into, as well as removed from, the receiving unit. The actuator acts on the at least one receiving unit, which is pivotally mounted with rotational mobility relative to the base unit, wherein the actuator has the capability to generate repeated bidirectional pivoting movements of the receiving unit. The arrangement includes at least one connector unit between the base unit and the receiving unit, wherein the receiving unit is pivotally supported on the connector unit with rotational mobility about a pivoting axis, wherein the connector unit is slidably supported with translatory mobility relative to the base unit, and wherein the actuator has the capability to generate repeated bidirectional translatory movements of the connector unit, whereby the receiving unit can be subjected to repeated bidirectional pivoting movements and, superimposed on the latter, repeated bidirectional translatory movements.

The free-flowing substances that are to be dispensed normally come in the form powders and granular bulk solids. However, the dosage-dispensing device can also be used to dispense pastes or other substances that are capable of moving in a flow. In particular, this includes materials with complex rheological properties that are prone to clog up in the dispensing process.

The superposition of a pivoting movement and a translatory movement agitates the structure of the dosage material with a composite oscillatory movement, whereby the dosage material is propelled towards the dispensing orifice. The flow behavior can be controlled through the intensity of the pulses and the frequency of the pivoting movement and/or the translatory movement.

In a preferred embodiment, the oscillating pivoting movements of the receiving unit and the oscillating translatory movements can be generated by means of the same actuator. This embodiment has the advantage that both the translatory movement and the pivoting movement can be generated with only one actuator and thus with only one motor.

An arrangement in which the pivoting movement and the translatory movement are generated simultaneously is realized advantageously with a concept wherein the oscillating or repeated bidirectional pivoting movement of the receiving unit can be generated by the actuator, and wherein the oscillating or repeated bidirectional translatory movement of the connector unit can be generated by means of the oscillating or repeated bidirectional pivoting movement of the receiving unit.

As an alternative, the dosage-dispensing device could also have more than one actuator, in particular two actuators, wherein the pivoting movement of the receiving unit can be generated by means of a first actuator, and the translatory movement of the connector unit can be generated by a second actuator.

A preferred embodiment includes the capability to synchronize the frequency of the repeated bidirectional pivoting movements of the receiving unit with the frequency of the repeated bidirectional translatory movements of the connector unit. There are different ways to achieve this synchronization. One possibility is to mechanically couple the participating components. In such an arrangement, the bidirectional pivoting movement of the receiving unit and the repeated bidirectional translatory movement of the connector unit are, for example, driven simultaneously by a single actuator. It is also possible to couple the bidirectional pivoting movement of the receiving unit to the repeated bidirectional translatory movement of the connector unit.

If more than one actuator is used, the synchronization of the bidirectional pivoting movement of the receiving unit with the bidirectional translatory movement of the connector unit can be achieved by means of an electronic control device. However, it is also possible to operate the actuators asynchronously. The superposition of asynchronous frequencies produces a beat frequency oscillation which, depending on the properties of the dosage material, counteracts the clotting tendency of the dosage material.

In the operating position of the dosage-dispensing device, the connector unit is preferably supported with vertical mobility relative to the base unit. To satisfy this condition, it can also be sufficient if the direction of movement of the connector unit relative to the operating position of the dosage-dispensing device has a horizontal as well as a vertical component. Ideally in this case, the vertical component is larger than the horizontal component of the movement vector. This ensures that the receiving unit is subjected to an up- and down movement, whereby the dosage material contained in the dosage-dispensing unit is likewise subjected to an up- and down movement and, as a result, the dosage material is loosened up and separated from the walls.

Preferably, when the dosage-dispensing device is in its operating position, the orientation of the pivot axis is essentially horizontal. Ideally, with the dosage-dispensing device in operating position, the outlet orifice of the dosage-dispensing unit moves in an arc of primarily constant radius about the pivot axis. This imparts a swiveling movement to the dosage material approaching the outlet opening, whereby the flow movement is improved.

Ideally, the base unit is connected to the receiving unit by means of an articulated joint, for example a rotary bearing or a ball joint.

Preferably, the connector unit is connected to the base unit by means of at least one linear bearing.

In the operating position of the dosage-dispensing device, the base unit is in essence rigidly connected. Thus, the base unit provides a stable support for the connector unit.

Ideally, the receiving unit and the connector unit are coupled to each other by means of a pre-tensioned spring element. This allows a movement of the receiving unit to be passed on to the connector unit. The spring element can further exert a damping effect in the transfer of the movement.

In a preferred embodiment, the actuator includes a hammer mass designed to be propelled by an impact spring, wherein the latter can be cocked with a tensioning mechanism and instantaneously released, so that the hammer mass is accelerated by the impact spring and the impact of the hammer mass on the receiving unit and/or on parts connected to the receiving unit and/or on the connector unit and/or on parts connected to the connector unit generates a shock wave in the receiving device. The resultant shock waves counteract the clotting tendency of the dosage material.

Of course, it is also possible to use other actuators such as for example piezo- or ultrasonic actuators.

With a suitable choice of the spring elements and impact springs, the time sequence and velocity of the movements can be influenced, whereby the flow of the dosage material towards the dispensing orifice can be optimized.

All of the guide elements can include rolling elements. They can further include elastomeric materials and/or elastically flexible elements such as for example leaf springs, or flexure elements consisting of a metal and/or a polymer.

With the installation of additional features in the source container, the clotting tendency of the dosage material can be reduced further. Installations at the access to the dispensing orifice have been found to be particularly advantageous. These installed features can have the most diverse shapes. The underlying idea for the use of these installed features is to make the pressure distribution in the dosage material upstream of the dispensing orifice as uniform as possible, because a clumping-together of the dosage-material is to be expected especially in those regions where the material is subjected to large pressure- and/or velocity gradients. The installation can have the shape of simple sheet-metal elements. It is also conceivable to use more complex shapes. An installation of conical elements proved to be effective against the clogging of the dosage material. In operating position, the apex of the cone is directed in essence against the flow direction of the dosage material. The dosage material streams over the cone, more specifically its lateral surface, from the apex. After flowing around the cone or its lateral surface, the stream of dosage material closes up again. The measure of directing the flow around the cone, more specifically its lateral surface, is very effective in reducing large pressure- and/or velocity gradients, whereby a more uniform pressure- and or velocity distribution is achieved.

Likewise, displacement bodies with streamlined shapes of the kind that are used for example in silos are an effective means to achieve a more uniform pressure- and/or velocity distribution.

BRIEF DESCRIPTION OF THE DRAWINGS

The dosage-dispensing unit is hereinafter explained through examples and with references to the drawings, wherein.

DETAILED DESCRIPTION

Figure 1:
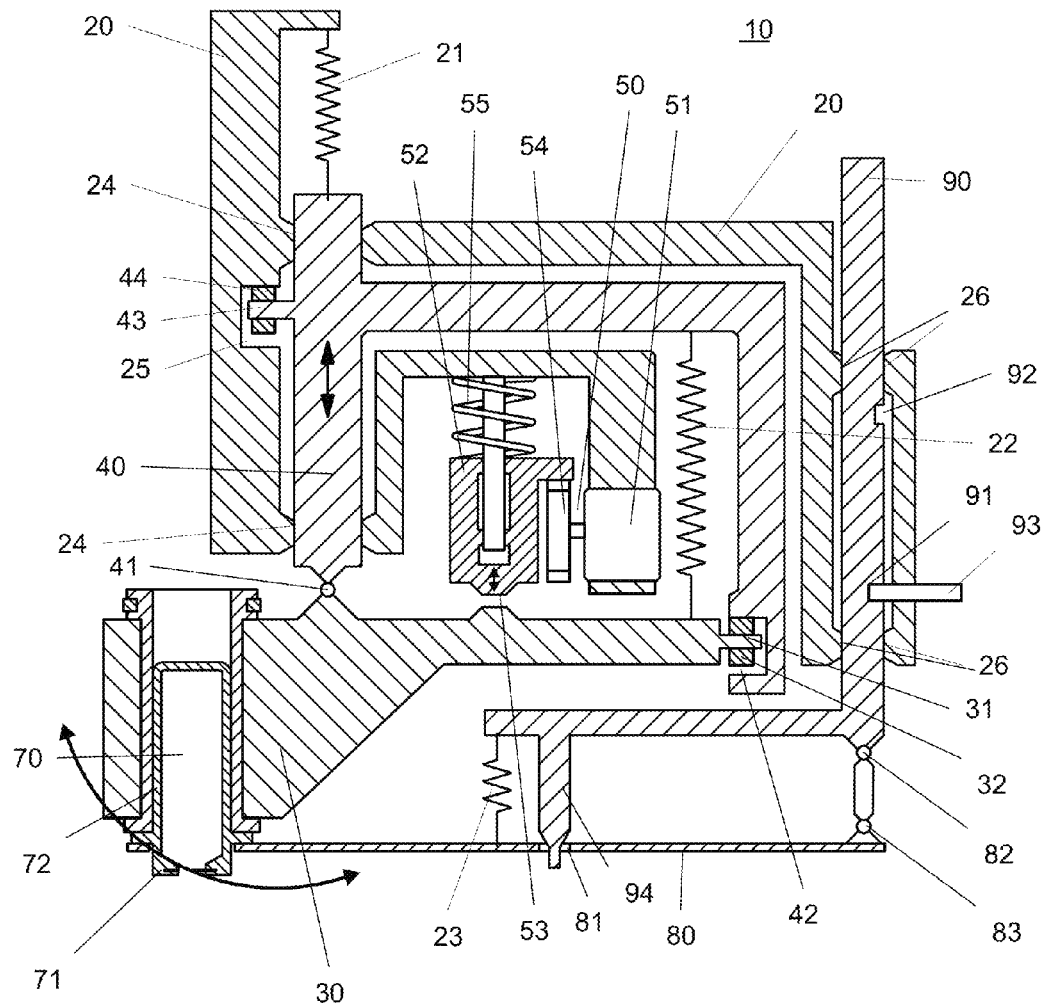
FIG. 1 is a sectional view of a first embodiment dosage-dispensing device in neutral position with one actuator.

In FIG. 1, a first dosage-dispensing device 10 with an actuator 50 is shown in neutral position in a sectional view. A second dosage-dispensing device 110 in neutral position with two actuators 150, 160 is shown in a sectional view in FIG. 2.

Each of the two dosage-dispensing devices 10, 110 has a base unit 20, 120, a receiving unit 30, 130, and a connector unit 40, 140. The base unit 20, 120 serves to fasten and to support the further units. The base unit 20, 120 is in most cases immovably mounted and essentially rigid. The base unit 20, 120 can be, for example, rigidly connected to the housing or to the ground below. It is also possible that the base unit 20, 120 is part of the housing. The receiving unit 30, 130 serves to hold a source unit 70. The source unit 70 includes a source container 72 and a dispensing head 71. The source container 72 serves to hold the dosage material. In the operating position of the dosage-dispensing device 10, 110, the dosage material is located above the dispensing head 71. The dispensing head 71 is designed to open and close and serves to control the outflow of dosage material from the source container 72. The opening and closing of the dispensing head 71 is controlled by means of a controller (not shown in the drawing). When the dispensing head 71 is open the dosage material flows out of the source container 72 under the force of gravity. The source unit 70 can be set into, and taken out of, the receiving unit 30, 130. Normally, the source container 72 is essentially cylindrical, and the receiving unit 30, 130 has a round opening as a seat for the source container 72. Of course, one could also choose any other shape as long as it provides a compatible seat for the source container 72 in the receiving unit 30, 130. In particular, it would also be possible to arrange intermediate elements between the receiving unit 30, 130 and the source unit 70.

The source unit 70 is held in place in the receiving unit 30, 130 by means of a holder 80, 180. The holder 80, 180 is resiliently attached to a holder base 90, 190 by means of a pre-tensioned spring element 23, 123 and by way of two hinges 82, 83, 182, 183. A centering pin 94, 194 of the holder base 90, 190 cooperating with a perforation 81, 181 of the holder 80, 180 allows the latter to be held in a defined position relative to the holder base 90, 190. The elastic force of the spring element 23, 123 pushes the source container 70 into the receiving unit 30, 130 against the force of gravity. The holder base 90, 190 is secured to the base unit 20, 120. The holder base 90, 190 can take at least two positions. In the operating position, the holder 80, 180 which is fastened to the holder base 90, 190 retains the source unit 70 in the receiving unit 30, 130. In the loading position, the holder 80, 180 is moved away from the receiving unit 30, 130 to clear the space so that the source unit 70 can be set into, or removed from, the receiving unit 30, 130. In the operating position of the dosage-dispensing device, the holder 80, 180 has a substantially horizontal orientation.

The holder base 90, 190 is connected to the base unit 20, 120 by way of a linear bearing 26, 126. The axis of the linear bearing 26, 126 has a substantially vertical orientation. By means of a first indent 91, 191 of the holder base 90, 190 cooperating with a pin 93, 193, the holder base 90, 190 can be secured in the operating position. A second indent 92, 192 of the holder base 90, 190 cooperating with the pin 93, 193 allows the holder base 90, 190 to be secured in the loading position. Of course, the holder base 90, 190 could also be secured in some other way. For example, the holder base 90, 190 could be held in place on the base unit by means of a spring detent.

The holder base 90, 190 does not necessarily have to be connected to the base unit 20, 120. The holder base 90, 190 could also be fastened in some other way that allows the holder 90, 190 to be switched between an operating position and a loading position.

The connector unit 40, 140 is attached to the base unit 20, 120. Interposed between the connector unit 40, 140 and the base unit 20, 120 is a linear bearing 24, 124 which allows a vertical displacement of the connector unit 40, 140 relative to the base unit 20, 120 which is mounted in an essentially fixed position. The range of vertical movement of the connector unit 40, 140 is delimited by a recess 25, 125 of the base unit 20, 120 cooperating with a projection 43, 143 of the connector unit 40, 140 to form an end stop. Relative to the operating position of the dosage-dispensing device 10, 110, the projection 43, 143 has an essentially horizontal orientation. Damper elements 44, 144 can be arranged between the projection 43, 143 and the end stop recess 25, 125. The damper elements 44, 144 can be made of a flexible material such as for example rubber or a polymer.

Of course, it is also possible to limit the range of vertical movement in some other way. In particular, there could be an end stop recess arranged in the connector unit 40, 140 which would cooperate with a projection of the base unit 20, 120. In principle, any kind of suitable end stop could be chosen.

A first spring element 21, 121 which is arranged between the base unit 20, 120 and the connector unit 40, 140 holds the connector unit 40, 140 in a predefined neutral position. The first spring element 21, 121, in its predefined neutral position, is pre-tensioned to pull the connector unit 40, 140 in the vertical direction, relative to the operating position of the dosage-dispensing device 10, 110, against the flank of the end stop recess 25, 125.

The connector unit 40, 140 is connected to the receiving unit 30, 130. The connector unit 40, 140 and the receiving unit 30, 130 are linked together by a pivoting joint 41, 141 which allows a pivoting movement of the receiving unit 30, 130 relative to the connector unit 40, 140, while the latter is capable of linear movement in an essentially vertical direction. There are also alternative choices for the connector elements that allow the pivoting movement between receiving unit 30, 130 and the connector unit 40, 140 to take place. The possibilities include in particular radial bearings and crossed flexure pivots.

The range of the pivoting movement of the receiving unit 30, 130 is delimited by a recess 42, 142 of the connector unit 40, 140 cooperating with a projection 31, 131 of the receiving unit 30, 130 to form an end stop. Relative to the operating position of the dosage-dispensing device 10, 110, the projection 31, 131 has an essentially horizontal orientation. Damper elements 32, 132 can be arranged between the projection 31, 131 and the end stop recess 42, 142.

Of course, it is also possible to limit the range of the pivoting movement in some other way. In particular, there could be a projection arranged on the connector unit 40, 140 which would cooperate with an end stop recess of the receiving unit 30, 130. In principle, any kind of suitable end stop could be chosen.

A second spring element 22, 122 which is arranged between the connector unit 40, 140 and the receiving unit 30, 130 holds the receiving unit 30, 130 in a predefined neutral position. The second spring element 22, 122, in its predefined neutral position, is pre-tensioned to pull the receiving unit 30, 130 in the vertical direction, relative to the operating position of the dosage-dispensing device 10, 110, against the flank of the end stop recess 42, 142.

Due to the rotational mobility of the receiving unit 30, 130, the source unit 70, 170 which is seated in the receiving unit 30, 130 can be subjected to a pivoting movement which promotes the flow of the dosage material in the dispensing head.

Due to the axial mobility of the connector unit 40, 140, the source unit 70, 170 which is seated in the receiving unit 30, 130 can be subjected to an up- and down movement which promotes the flow of the dosage material in the dispensing head.

As has been found, a combination of pivoting movements and up/down movements promotes the flow of the dosage material in the dispensing head.

The pivoting movements and the up/down movements are generated by suitable actuators 50, 150, 160. It has been found that pulse-shaped impacts are most effective in counteracting the clogging of the dosage material. In the dosage-dispensing device 10 of FIG. 1, a single actuator 50 is employed to generate the pivoting movement and the up/down movement. The actuator 50 serves to deliver shock impacts to the receiving unit 30. These impacts cause a pivoting movement of the receiving unit 30. The pivoting movements of the receiving unit 30, in turn, cause an up- and down movement of the connector unit 40.

Figure 2:
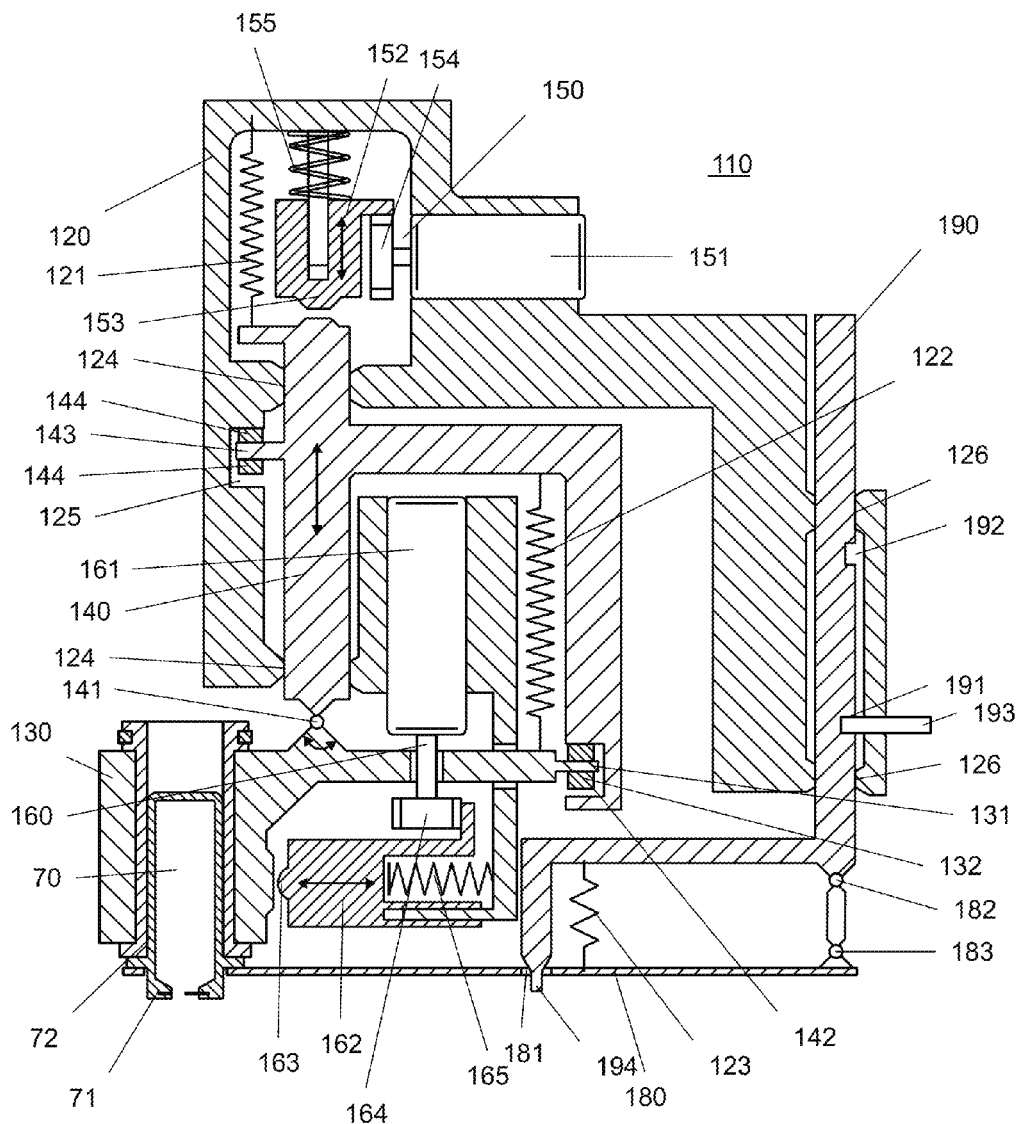
FIG. 2 is a sectional view of a second embodiment dosage-dispensing device in neutral position with two actuators.

In the dosage-dispensing device 110 of FIG. 2, two actuators 150, 160 are employed to generate the pivoting movement and the up/down movement. The actuator 150 serves to deliver shock impacts to the receiving unit 130. These impacts cause a pivoting movement of the receiving unit 130. The additional actuator 160 serves to deliver shock impacts to the connector unit 140. These impacts cause an up- and down movement of the connector unit 140.

Each of the actuators 50, 150, 160 of the two embodiments includes a drive unit 51, 151, 161. The drive unit 51, 151, 161 can for example be an electric motor. The drive unit 51, 151, 161 drives a translatory-motion mechanism 54, 154, 164 which converts the rotary movement of the motor into a linear movement. The translatory-motion mechanism 54, 154, 164 can include for example an eccentric, a cam shaft, a crown gear and/or a curve follower mechanism. Good results were achieved with a cam shaft with ramp-shaped cams, which showed the capability to produce rapid pulse impacts. The translatory-motion mechanism 54, 154, 164 serves to propel a hammer mass 52, 152, 162 in a linear movement. The hammer mass 52, 152, 162 is supported with linear mobility. A bumper 53, 153, 163 is formed on the hammer mass 52, 152, 162 in the form of a projection through which a strike can be directed at the receiving unit 30, 130 and/or at the connector unit 40, 140. In order to impart a pivoting movement to the receiving unit 30, 130, the strike has to occur in the axial direction relative to the pivoting joint 41, 141. The larger the distance of the strike from the pivoting joint 41, 141, the stronger will be the lever effect. The impact pulse can be made even stronger with the addition of an impact spring 55, 155, 165. The impact spring 55, 155, 165 can be cocked with a tensioning mechanism and instantaneously released. After it has been released, the hammer mass 52, 152, 162 is accelerated by the impact spring 55, 155, 165 and the impact of the hammer mass 52, 152, 162 on the receiving unit 30, 130 and/or on the connector unit 40, 140 generates a shock wave in the receiving device. This shock wave counteracts the clotting tendency of the dosage material in the source unit 70.

While the invention has been described through the presentation of a specific embodiment, it is considered self-evident that numerous further variant embodiments could be created based on the teachings of the present invention.

What is claimed is:

1. A device for dispensing measured dosages of a free-flowing substance, from a source unit, the device comprising:
    a base unit;
    a receiving unit into which the source unit can be selectively set and removed, the receiving unit mounted pivotally for rotational mobility relative to the base unit;
    a connector unit, arranged between the base unit and the receiving unit, the connector unit providing pivotal support to the receiving unit for rotational mobility about a pivoting axis, the connector unit also slidably supported for translatory mobility relative to the base unit, and
    an actuator, arranged to generate pivoting movements on the receiving unit; and arranged to generate translatory movements of the connector unit, such that the actuator superimposes pivoting movements and translatory movements on the receiving unit, where the respective pivoting and translatory movements are repeated bidirectional or oscillating movements.

2. The device of claim 1, wherein:
    the actuator generates both oscillating pivoting movement of the receiving unit and oscillating translatory movement of the connector unit.

3. The device of claim 1, wherein:
    the actuator generates repeated bidirectional pivoting movement of the receiving unit, which in turn generates repeated bidirectional translatory movement of the connector unit.

4. The device of claim 1, further comprising:
a further actuator, such that a first of the actuators generates oscillating pivoting movement of the receiving unit and a second of the actuators generates translatory movement of the connector unit.

5. The device of claim 4, further comprising:
a control device that synchronizes the repeated bidirectional pivoting movements of the receiving unit and the repeated bidirectional translatory movements of the connector unit.

6. The device of claim 5, wherein:
the control device is electronic.

7. The device of claim 1, wherein:
the connector unit is supported relative to the base unit with essentially vertical mobility when the device is in an operating position.

8. The device of claim 1, wherein:
the connector unit is supported with the freedom to move in a displacement direction having a vertical component when the device is in an operating position.

9. The device of claim 1, wherein:
the pivoting axis is oriented essentially horizontally when the device is in an operating position.

10. The device of claim 1, further comprising:
a pivoting joint that connects the connector unit to the receiving unit.

11. The device of claim 1, further comprising:
a linear bearing that connects the connector unit to the base unit.

12. The device of claim 1, wherein:
the base unit is rigidly fastened when the device is in an operating position.

13. The device of claim 1, further comprising:
a pre-tensioned spring element that couples the receiving unit and the connector unit.

14. The device of claim 1, wherein:
the actuator comprises:
a hammer mass, arranged to generate a shock wave in the receiving unit by impacting at least one of: the receiving unit, the connector unit, and a part connected to at least one of the receiving unit and the connector unit;
an impact spring arranged to propel the hammer mass; and
a tensioning mechanism arranged to cock and instantaneously release the impact spring.

15. The device of claim 14, wherein:
the actuator generates both oscillating pivoting movement of the receiving unit and oscillating translatory movement of the connector unit.

16. The device of claim 14, wherein:
the actuator generates repeated bidirectional pivoting movement of the receiving unit, which in turn generates repeated bidirectional translatory movement of the connector unit.

17. The device of claim 14, further comprising:
a further actuator, such that a first of the actuators generates oscillating pivoting movement of the receiving unit and a second of the actuators generates translatory movement of the connector unit.

18. The device of claim 17, further comprising:
a control device that synchronizes the repeated bidirectional pivoting movements of the receiving unit and the repeated bidirectional translatory movements of the connector unit.

19. The device of claim 18, wherein:
the control device is electronic.

20. A method of dispensing measured quantities by means of a dosage-dispensing device according to claim 1.

* * * * *